(12) United States Patent
Elder

(10) Patent No.: US 6,854,768 B2
(45) Date of Patent: Feb. 15, 2005

(54) FLUID CONDUITS AND METHOD OF MANUFACTURING SAME

(75) Inventor: Jack E. Elder, Rochester, MI (US)

(73) Assignee: Innatech, LLC, Rochester, MI (US)

( * ) Notice: Subject to any disclaimer, the term of this patent is extended or adjusted under 35 U.S.C. 154(b) by 14 days.

(21) Appl. No.: 10/132,075

(22) Filed: Apr. 25, 2002

(65) Prior Publication Data

US 2002/0167167 A1 Nov. 14, 2002

Related U.S. Application Data

(60) Provisional application No. 60/287,520, filed on Apr. 26, 2001.

(51) Int. Cl.⁷ ................................................ F16L 21/00
(52) U.S. Cl. ............................. 285/146.1; 285/146.3; 285/286.1; 285/285.1
(58) Field of Search ........................ 285/146.1, 146.3, 285/45, 261, 266, 286.1, 285.1, 294.1, 144.1, 146.2, 148.7, 148.11, 148.12, 235, 21.1, 381.4, 381.3, 381.2, 381.1, 381.5

(56) References Cited

U.S. PATENT DOCUMENTS

| | | | | |
|---|---|---|---|---|
| 1,276,117 A | * | 8/1918 | Riebe | ........................ 138/120 |
| 1,451,800 A | * | 4/1923 | Agner | ........................ 138/120 |
| 1,695,263 A | * | 12/1928 | Jacques | .................. 285/146.1 |
| 2,386,697 A | | 10/1945 | Lynch | |
| 3,170,720 A | * | 2/1965 | Browning | .................. 138/120 |
| 3,290,429 A | * | 12/1966 | Prescott et al. | ............. 138/120 |
| 3,591,669 A | | 7/1971 | Memory | |
| 3,674,014 A | * | 7/1972 | Tillander | .................. 138/120 |
| 3,961,770 A | | 6/1976 | Wrasman | |
| 4,739,801 A | * | 4/1988 | Kimura et al. | ............. 285/261 |
| 4,856,822 A | * | 8/1989 | Parker | ..................... 285/146.1 |
| 5,197,767 A | | 3/1993 | Kimura et al. | |
| 5,298,215 A | | 3/1994 | Krause | |
| 5,449,206 A | * | 9/1995 | Lockwood | ............... 285/146.1 |
| 5,647,713 A | | 7/1997 | Ge et al. | |
| 5,778,939 A | | 7/1998 | Hok-Yin | |
| 5,865,378 A | | 2/1999 | Hollinshead et al. | |
| 5,997,047 A | | 12/1999 | Pimental et al. | |
| 6,095,801 A | * | 8/2000 | Spiewak | .................. 285/146.1 |
| 6,164,570 A | | 12/2000 | Smeltzer | |
| 6,199,729 B1 | | 3/2001 | Drymkowski | |
| 6,253,712 B1 | * | 7/2001 | Johnson | ..................... 285/261 |
| 6,261,499 B1 | | 7/2001 | Okeke et al. | |
| 6,293,785 B1 | * | 9/2001 | McGovern | ............... 285/146.1 |
| 6,575,654 B2 | * | 6/2003 | Wentworth et al. | ...... 285/146.1 |
| 6,626,210 B2 | * | 9/2003 | Luettgen et al. | ............ 138/120 |

* cited by examiner

Primary Examiner—David Bochna
(74) Attorney, Agent, or Firm—Maginot, Moore & Beck

(57) ABSTRACT

A continuous flexible conduit is formed from like-configured components, each having a male joint member and a female joint member with a passageway extending therethrough. The female joint member is over-molded about a corresponding male joint member to form a substantially fluid-tight articulating joint. In a method of producing the flexible conduit, a single-shot molding process is used to form each like-configured component, with each newly formed component indexed within the single-shot mold so that the male joint member is within the female mold cavity for the formation of the next component. In an alternative embodiment, a continuous conduit is formed of two different sets of like configured components—one set having only female joint members and the other set having only male joint members. A two-shot molding process is described for continuous production of the flexible conduit using these two sets of components.

28 Claims, 4 Drawing Sheets

FLUID CONDUITS AND METHOD OF MANUFACTURING SAME

REFERENCE TO RELATED APPLICATION

This utility patent application claims priority to co-pending provisional application, Ser. No. 60/287,520, entitled "Fluid Conduits and Valves and Method of Manufacturing Same", filed on Apr. 26, 2001, the disclosure and figures of which is incorporated herein by reference.

BACKGROUND OF THE INVENTION

Flexible conduits, hoses and tubes are known in many fields. Flexible conduits are frequently used as part of a fluid system, the garden hose being a well-known example. One improvement to these known flexible conduits has been the inclusion of configurable joints along the length of the conduit. In a typical configurable conduit, a series of segments are joined at ball-and-socket joints. The friction between the ball element and socket element helps hold adjacent segments in a particular orientation. In addition, the close running fit between these elements ostensibly acts as a fluid sealing surface to minimize leakage.

Configurable flexible conduits of this type are used in many application. For instance, U.S. Pat. No. 6,164,570 shows a ball-and-socket hose construction fur use in household plumbing. A similar apparatus is implemented as a hands-free drinking system in U.S. Pat. No. 6,199,729. Rather than using the flexible conduit for conveying liquids, U.S. Pat. No. 5,197,767 contemplates a configurable conduit for concealing and protecting cables, wires, hoses and the like. A flexible configurable tube design is used as part of a movable limb for a doll in U.S. Pat. No. 5,620,352, and as a vacuum cleaner hose in U.S. Pat. No. 5,778,939.

The wide versatility of the flexible configurable conduit can be readily appreciated from these examples. Most of these devices utilize a ball-and-socket joint between multiple links or segments. In the typical case, the individual segments are formed independently and then snapped together. In more complicated constructs, various fastening rings or flanges are required to connect the joint components, and consequently the individual links, together.

One detriment inherent with many of these prior approaches is that the articulating joint is not fluid-tight. Thus, the prior ball-and-socket snap-fit devices are usually limited to low pressure applications or uses where a little fluid leakage does not pose a problem. In some prior devices, the leakage problem is addressed by the inclusion of a seal ring or gasket to the ball-and-socket joint, which necessarily adds cost and complexity of production.

Even where the configurable conduit is not being used to carry a fluid, the prior devices suffer from the additional detriment of requiring piece-by-piece, or link-by-link, assembly. In other words, the links are first produced in a molding or casting process, or similar operation. Then the individual links are snapped together, usually manually, which makes production of any significant length of configurable flexible conduit unwieldy and expensive.

Another detriment of the flexible conduits mentioned above is that the links can be pulled apart, often more easily than when the links are snapped together. Inadvertent and unexpected disassembly of the conduit can range from simply a nuisance, such as where the conduit is used to shield a cable, to a potential disaster, such as where the conduit is part of a home plumbing system.

Therefore, there is a need for a flexible configurable conduit that addresses the many detriments of prior attempts at conduits of this type. More specifically, there is a need for a conduit that can be more easily and cheaply produced, that are not prone to inadvertent disassembly and that maintain a fluid-tight connection at the conduit joints.

SUMMARY OF THE INVENTION

In order to address these needs, the present invention contemplates a flexible configurable conduit that is produced using an over-molding process. In one embodiment of the invention, a flexible conduit is provided that comprises a plurality of like-configured components or links, each of the components including a male member at one end and a female member at another end, and a passageway extending between the male member and the female member. The components are formed in a molding process, such as a plastic injection molding process. In accordance with one aspect of the invention, the female member of one component is over-molded about a male member of an immediately adjacent component. The female component can be over-molded to surround a substantial portion of the male member, thereby significantly reducing the likelihood, or even ability, for the two components to be disassembled.

In a further feature of the invention, a series of these components can be continuously formed using the same mold. In other words, each of the components can be like configured. In accordance with this feature, the mold can be provided with a section for forming the female member and a section for forming the male member. A newly formed component can be indexed within the mold so that the male member of the newly formed component is disposed within the female section of the mold. A subsequent component can then be formed in the mold with the male member of the newly formed component cooperating with the female mold section to form the female member of the successive component. Each newly formed component is indexed in turn so that its respective male member is disposed within the female mold section. This process can continue indefinitely to produce a flexible configurable conduit of any desired length.

In another embodiment of the invention, the continuous length of conduit can be formed by two sets of like-configured components. One set of components includes only male members of an articulating joint, while the other set of components includes only female members of the joint. Thus, in the preferred embodiment, the first set of components includes ball members at their opposite ends, while the second set includes socket members at their opposite ends.

With this embodiment, two distinct mold units are required, one having only male molding sections and the other only female molding sections. The mold units are adjacent so that a finished component from one unit can be indexed to the other unit for the over-molding process. Preferably, two newly formed components having only male joint members are indexed so that one male member is disposed within each of the female cavities of the adjacent female molding unit.

In a preferred embodiment of the invention, the male member of one component and the female member of an immediately adjacent component define an articulating joint, and most preferably a ball-and-socket joint. Alternatively, the joint between the two components can be non-articulating, or only certain joints in a continuous chain can be provided with non-articulating joints. The components are also preferably formed so that the passageway in adjacent components remain in communication at any orientation of the articulating joint. Alternatively, the passageway and joint between adjacent components can be configured so that the passageway can be closed at certain orientations of adjacent components.

In one embodiment, the flexible conduit the female member is over-molded about the male member to define a close running fit therebetween. However, in the most preferred configuration, the female member is over-molded about the male member to define a substantially fluid-tight fit therebetween.

In certain aspects of the invention, some of the flexible conduit components or links are formed of a first material, while others of the components are formed of a second material that is different from the first material. In certain embodiment, the materials have different colors. In other embodiments, the materials can have different melting temperatures to facilitate the over-molding process.

One embodiment of the invention contemplates a method for manufacturing a flexible conduit. One step of the method involves molding a first component having a male member at a first end and either a male member or a female member at a second end, and a passageway extending between the first and second ends of the first component. In a subsequent step, a second component is molded having a female member at a first end if the first component has a male member at its second end, or a male member at a first end if the first component has a female member at its second end. The second component is molded to include a female member at a second end that is over-molded about the male member at the first end of the first component. The second component is also molded to include a passageway extending between the first and second ends of the second component.

In a preferred embodiment, the female member of the second component is over-molded about the male member of the first component to form an articulating joint, and most preferably a ball-and-socket joint. Further, in the preferred embodiment, each of the first and second components is elongated and the components are molded with the passageway extending axially therethrough.

In one feature of the inventive method, the first and second components are molded in a common mold. The first and second components can be identical, each including a male member at its first end and a female member at its second end. Thus, the mold can most preferably be a single-shot mold. With the single shot mold, the method can include the steps of allowing the first component to at least partially cool within the mold, and then indexing the first component so that the male member is disposed within a cavity of the mold forming the female portion of the components. These method steps, namely the forming, cooling and indexing steps, can be continuously and successively repeated to form a continuous length of flexible conduit.

In certain embodiment, a sheath can be provided around at least a portion of the continuous length of the flexible conduit. The sheath can be formed of a variety of materials, including a relatively more rigid material to stiffen the portion of the conduit. Likewise, the sheath can be flexible and can even constitute a shrink formed film over the completed flexible conduit.

In one version of the inventive method, the first and second components are different, with the first component including a male member at each end and the second component including a female member at each end. In this version, the first and second components are preferably molded in the same double-shot mold. In this method, a male mold section is provided for forming the first component, and a female mold section is provided for forming the second component. The female mold section has a first cavity for forming the female member at the first end of the second member, and a second cavity for forming the female member at the second end of the second member, with the second cavity being disposed nearer to the male mold section than the first cavity. With this configuration of the double shot mold, the method can include the steps of forming a first one of the first members and then indexing the first one so that the male member at the second end of the member is disposed within the first cavity of the female mold section. A second one of the first members is then formed and indexed so that the male member at its first end is disposed within the second cavity of the female mold section. At that point, the second component can be formed with the female members being over-molded about a corresponding male member of the first component.

It is one object of the invention to provide a flexible fluid conduit that can be formed in a molding process. A more particular object is to provide a conduit that effectively utilizes an over-molding process to form joints in the flexible conduit.

One benefit of the present invention is that is greatly simplifies the process for manufacturing a continuous length of flexible conduit. A further benefit is realized by features of the invention that allow product of a substantially fluid tight seal between articulating components of the flexible conduit.

Still another benefit is that the over-molded joint allows the joint to be manipulated to a variety of orientations and retain those orientations due to the friction and stress between the over-molded part. Other objects and benefits of the invention will become apparent upon consideration of the following written description taken together with the accompanying figures.

DESCRIPTION OF PREFERRED EMBODIMENTS

Figure 1:
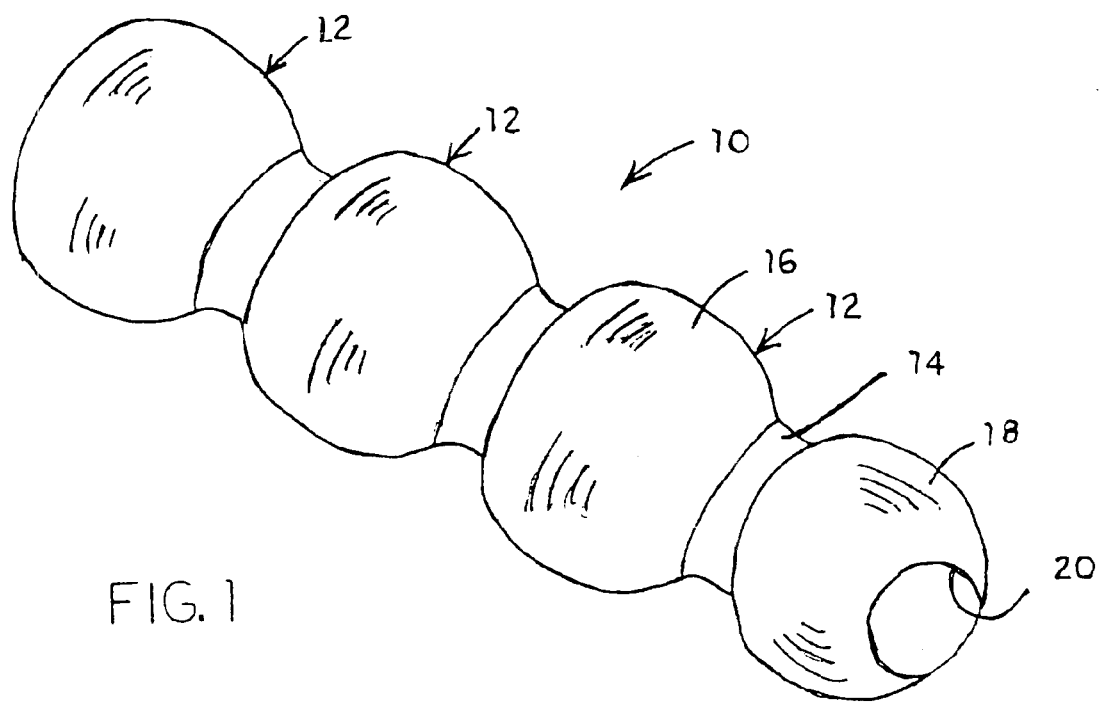
FIG. 1 is a perspective view of a flexible conduit in accordance with one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In accordance with one aspect of the invention, a continuous flexible conduit 10 includes a series of like-configured components or links 12, as shown in FIG. 1. For the purposes of the present disclosure, the conduit 10 is provided as a fluid conduit capable of conveying a pressurized fluid. Of course, it will be readily appreciated that this inventive flexible conduit can be utilized in a wide variety of applications and uses. For instance, the conduit can be used as a cable sheath to enclose and protect an actuator cable.

Figure 2:
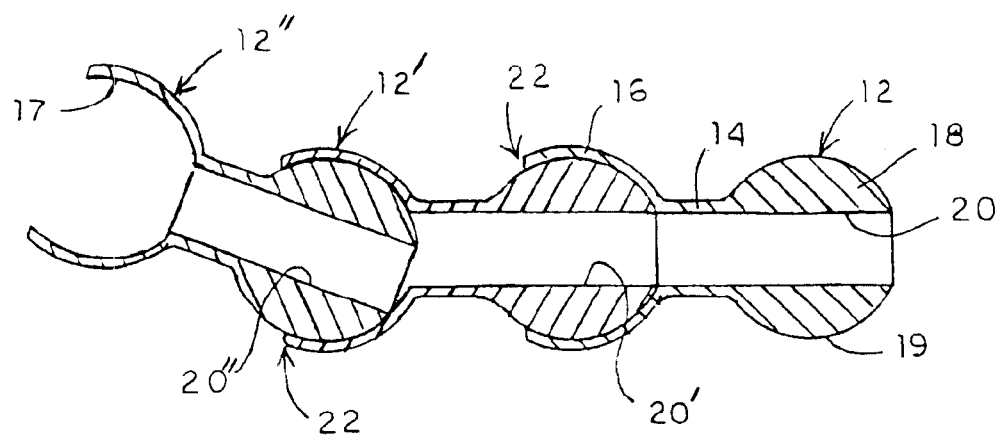
FIG. 2 is a side cross-sectional view of a portion of the flexible conduit shown in FIG. 1

As shown in FIG. 1 and in more detail in FIG. 2, each of the like-configured components 12 includes an elongated body portion 14 with an articulating joint element defined at each end of the body portion. In the illustrated embodiment, the component includes a first joint member, or a female member 16 at one end, and a second joint member, or a male member 18 at the opposite end. In the preferred embodiment of the invention, the two joint members combine to form an articulating joint 22. In the context of the present invention, an articulating joint is a joint that permits relative movement between the connected components. In the most preferred embodiment, the articulating joint is a ball-and-socket joint, where the female member 16 is the socket and the male member 18 is the ball. It is understood, however, that other articulating joints having fewer degrees of freedom are contemplated.

Each component 12 includes a passageway 20 extending between the ends of the component, or between the female and male joint members 16, 18. In the illustrated embodiment, the passageway extends axially along the length of the body portion 14 and male member 18 In the preferred embodiment, the passageway 20 is oriented and sized so that the passageways in adjacent connected components are always in fluid communication, regardless of the relative orientation between the components. Thus, even when one component, such as component 12", is rotated at an angle relative to another component, such as component 12' in FIG. 2, the respective passageways 20" and 20' remain in communication with each other. However, the passageway can be modified so that the opening of the passageway in the male member 18 can be partially or totally obstructed by the inner surface 17 of the female joint member 16.

In accordance with one feature of the flexible conduit 10, the inner surface 17 of the female member 16 is configured to surround a substantial portion of the male member 18, and more particularly to surround more than half of the outer surface 19 of the male member. In this way, the ball-and-socket joint 22 can be resistant to unintended dislodgement, while still retaining a significant degree of articulation between the joint members. In a specific preferred embodiment, the inner surface 17 of the female portion 16 subtends an angle of about 220–230° around the male portion 18. In accordance with a further aspect of the present invention, the articulating joint 22 is formed in an injection molding process known in the art as over-molding. In the usual application of this molding process, a separate component is situated within a mold cavity and the cavity is filled with a moldable material such as plastic. For the present invention, the male portion 18 is formed first and then is used in conjunction with the mold assembly in forming the female portion 16.

Figure 3:
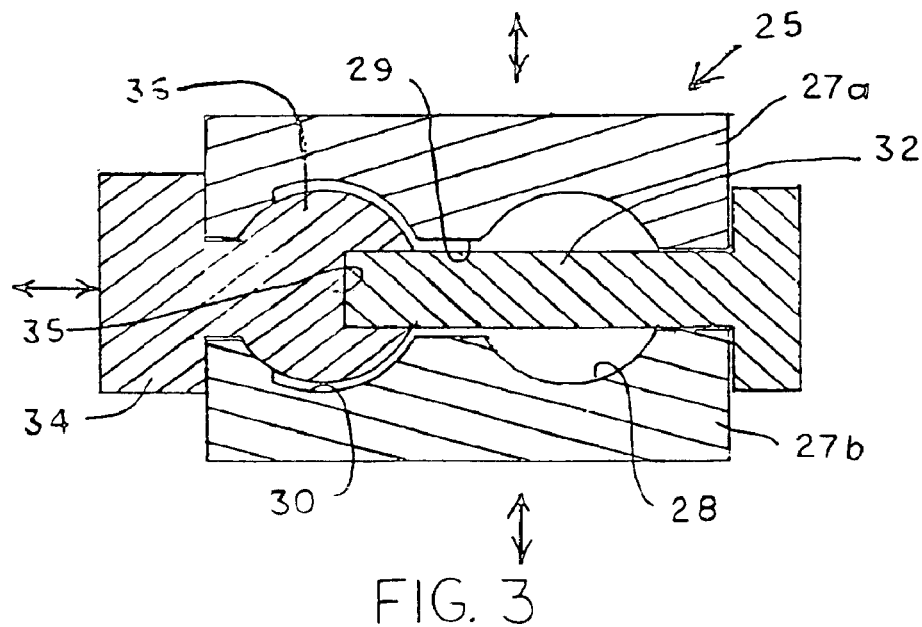
FIG. 3 is a side cross-sectional view of a mold apparatus particularly suited for producing components of the flexible conduit depicted in FIGS. 1 and 2 in accordance with a further embodiment of the invention.
Figure 4:
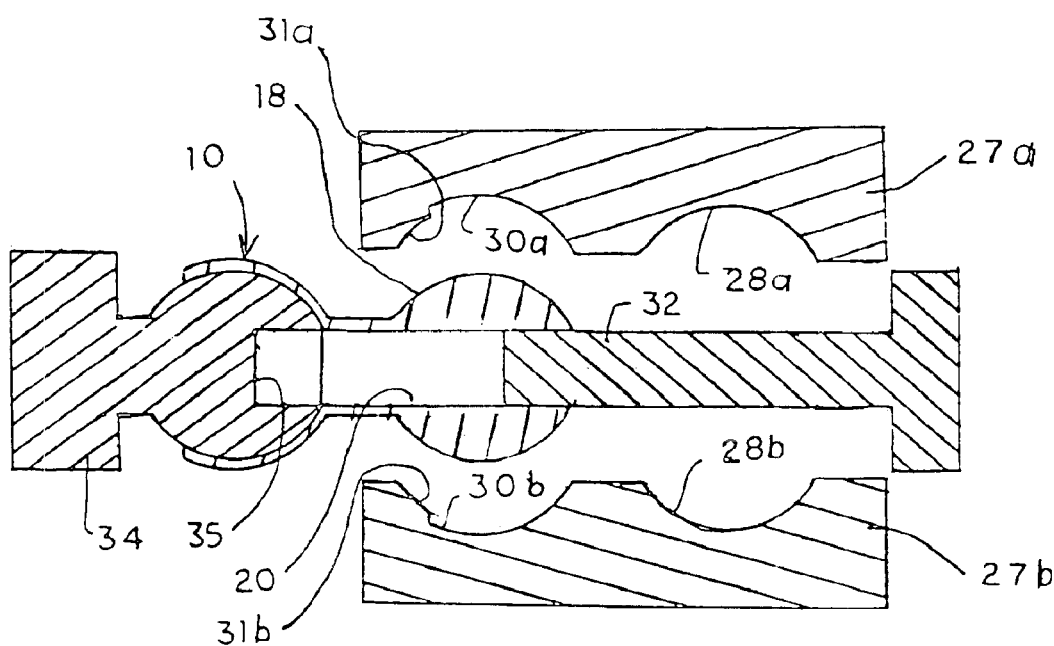
FIG. 4 is a side cross-sectional view of the mold apparatus shown in FIG. 3, showing one step in the further embodiment.
Figure 5:
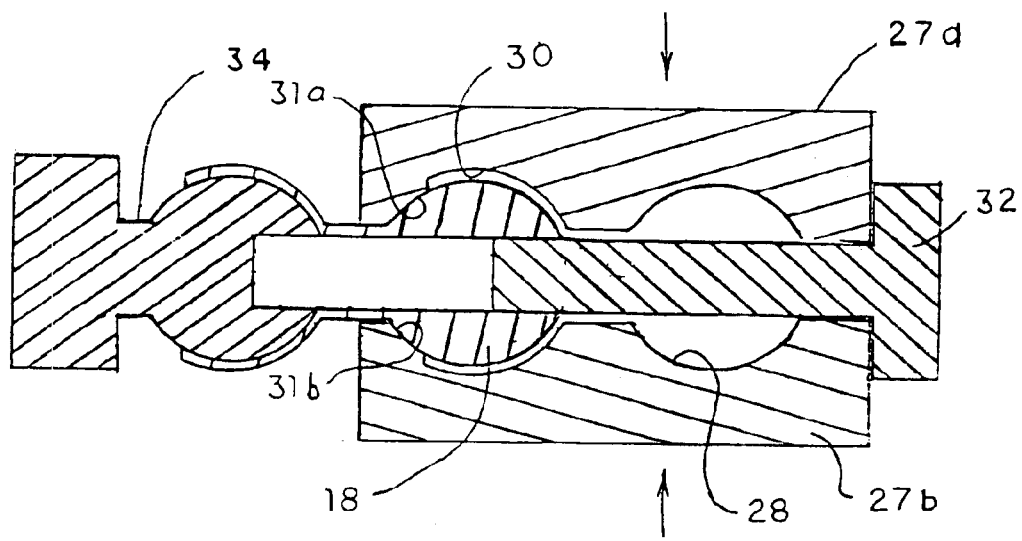
FIG. 5 is a side cross-sectional view of the mold apparatus shown in FIG. 3, showing a subsequent step in the further embodiment.

A molding process in accordance with one embodiment of the invention is illustrated in FIGS. 3–5. More specifically, a mold assembly 25 is provided for molding a single conduit component 12. The mold assembly can include two primary mold halves 27a and 27b that can move together and apart in the direction of the vertical arrows. The two mold halves 27a, 27b combine to define a cavity for forming the male member, referred to as the male cavity 28, and a cavity for forming the female member, referred to as the female cavity 30. The mold halves also define a body cavity 29 between the male and female cavities. The length of the body cavity 29 determines the length of the body portion 14 between the opposite articulating joint members in the final formed component 12. The mold halves can include flow channels (not shown) for introducing the injectable material used to form the component 12. The size and arrangement of the flow channels can be determined in accordance with known principles of injection molding to provide a uniform and flaw-free component 12.

Since the conduit component 12 includes a passageway 20, the mold assembly 25 can include a core element 32. Preferably, the core element 32 remains stationary as the mold halves are moved together and apart. The core element 32 has a diameter corresponding to the diameter of the passageway 20. The core element 32 must have a length sufficient to span the male cavity 28 and the body cavity 29; however, most preferably the core element has a length that extends into the female cavity 30 for reasons discussed below. The core element cooperates with the mold halves to form the passageway through the body portion and male member of the molded component 12.

The mold assembly can include an initial mold insert 34 that is used to form the female joint member 16 of the first component or link of the flexible continuous conduit. Thus, the mold insert can have a portion 36 in the form of the male joint member 18 and can reside within the female cavity 30 to cooperate with the mold halves to form the female joint member 16. The insert 35 can include a recess 34 for receiving the free end of the core element 32, as depicted in FIG. 3. The combination of the mold halves 27a, b, core element 32 and insert 34 present a cavity into which the moldable material flows to form of the conduit component 12.

In the illustrated embodiment, the insert 35 is part of the mold assembly 25. In an alternative embodiment, the insert 35 can be replaced by an end component for the continuous conduit. The end component must include the male portion 36 disposed within the female cavity 30. The configuration of the remainder of the end component can be dictated by the particular eventual use for the flexible conduit 10. For instance, the end component can provide a threaded end for connection to another device, or can include a fluid valve assembly.

For the illustrative purposes, it is presumed that the insert 34 is part of the mold assembly 25. In the manufacture of the continuous conduit 10, the first step is to form the first link or component in the chain length. With the mold assembly in its operative position shown in FIG. 3, the moldable material, such as a plastic, is introduced into the cavities 28, 29 and 30. The material is allowed to at least partially cool so that the female joint portion 16 shrinks snugly around the male portion 36. When the component is sufficiently cooled, the mold halves are separated and the component is indexed as shown in FIG. 4. This indexing can be accomplished by moving the insert 34 away from the mold halves in the direction of the horizontal arrow (FIG. 3). The component is indexed to a position in which the male member 18 is situated within the female cavity formed by the cavity portions 30*a* and 30*b*.

As shown in FIG. 3, the core element 32 remains stationary during this indexing operation. Thus, the core element serves to support the male portion 18 of the newly molded component 12. When the mold halves 27*a*, 27*b* are moved back together, the male joint member 18 combines with the mold halves to define the female cavity, as shown in FIG. 5. It can be appreciated that the mold halves 27*a, b* can include a mating surface 31*a*, 31*b* that provides a tight sealing contact with the newly formed male member to prevent the flow of the injectable material beyond the end of the female cavity. The injectable material is again introduced into the mold halves so that the new female joint portion 16 is over-molded about the recently formed male joint portion 18. The result of this over-molding process is a snugly fitting connection between adjacent conduit components that provides a substantially fluid-tight joint. The friction inherent in the molded joint is enough to secure positioning but not enough to prevent intended movement of the ball-and-socket joint into infinite configurations.

Once the next component has been formed, the mold halves are separated, as shown in FIG. 4, and the newly formed connected conduit components are indexed so that the male member of the most recently formed component is disposed within the female cavity 30, as shown in FIG. 5. It can be readily appreciated that this process can continue indefinitely, with each newly formed component being indexed so that a new component can be formed with an automatic snug connection as part of the chain of components forming the flexible conduit 10. When the last component is to be molded, the mold halves can be replaced with different mold halves to form an end piece different from the conduit components 12.

The present process can be regarded as a one-shot process, meaning that the mold assembly 25 feeds the moldable material in a single shot to form a component. In one embodiment, the single-shot process accommodates a single material, such as a single type and color of plastic. Preferably, the material is selected so that the exposed surface of the male joint member 18 is not marred or melted when the molten material is introduced in the next mold cycle.

Alternatively, the mold assembly 25 can be modified to permit selective injection of different materials. For instance, the different materials can be plastics of different colors. The different colors can be alternated to form a decorative continuous conduit 10. In another instance, the different materials can have different flowing temperatures or solid melting temperatures. The different temperature properties can dictate the amount of cooling that is required before a component can be indexed and overmolded.

The advantages to this design include the ability to be run on a one-barrel press. This design also provides the best seal conditions between adjacent components or links. Most preferably, the newly formed component is completely cooled before being indexed and over-molded. The material can be selected to have a minimal cooling time. Alternatively, a cooling fluid can be passed over the newly formed component to hasten the cooling process. The cooling fluid can also serve as a protective layer on the newly formed component to prevent adhesion during the over-molding step. In addition, the cooling fluid can exhibit lubricative and sealing properties for the resulting articulating joint 22.

Figure 6:
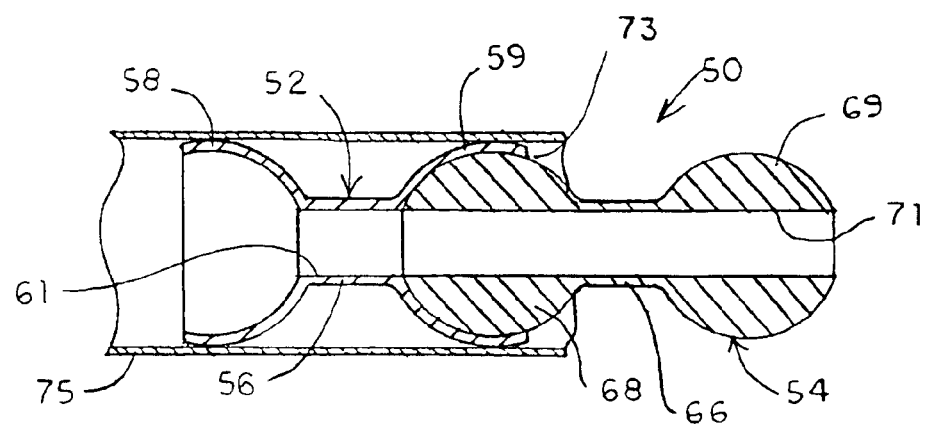
FIG. 6 is a side cross-sectional view of a portion of a flexible conduit in accordance with an alternative embodiment of the invention.

Referring now to FIG. 6, a second embodiment of the invention is depicted that is formed via a two-shot molding method. Specifically, a continuous conduit 50 includes a first segment or component 52 and a second segment or component 54. The first component 52 includes a body portion 56 having a female member 58, 59 formed at each of its ends. The first component defines a passageway 61 through the body portion and communicating with the female members 58, 59.

The second component 54 includes a body portion 66 having a male member 68, 69 at its opposite ends. A passageway 71 is defined through the body portion 66 and each male member 68, 69. In the most preferred embodiment, the female members 58, 59 and male members 68, 69 are configured to form a ball-and-socket joint when sockets are formed around the balls 211*b*, resulting in articulating links.

It should be understood that the continuous flexible conduit 50 is formed by an alternating series of the first, or female, component 52, and the second, or male, component 54. The components are joined in an over-molding process of the type described above so that a pre-determined length of conduit can be easily manufactured. The components can be configured so that the passageways 61 and 71 can be in constant communication regardless of the orientation of the articulating joint 73 formed between the female and male components, 52 and 54, respectively.

The continuous conduit 50 can be continuously molded, like the components 12 of the conduit 10 described above. However, unlike the components 12 which are like configured throughout the entire length of the conduit 10, the conduit 50 utilizes two sets of like configured components. Thus, a two-shot molding process is preferable for the formation of the conduit 50. In one exemplary process, a mold assembly 80 can include a female mold section 82 and a male mold section 84. In order to form the two passageways 61 and 71, the mold assembly 80 can also include a passageway core 86.

The two mold sections 82 and 84 are preferably adjacent each other, with the female mold section 82 being situated downstream from the male mold section 84. The two mold sections can be appropriately configured to form the respective female socket members 58, 59 and male ball members 68, 69, each with the core 86 extending therethrough. As with the components 12 and conduit 10 described above, the socket members 58, 59 are each over-molded about a respective ball member 69, 68. In a first step of the two-shot process, a first one of the male components 54 is produced in the male mold section 84. The mold halves of the male section are opened, as indicated by the arrows in FIG. 7, and the first newly formed male component 54 is indexed to a position within the female mold section 82. Most preferably, the first male component 54 is indexed so that its right-most ball member 69 is disposed in the farthest left-most cavity of the female mold section 82.

Figure 7:
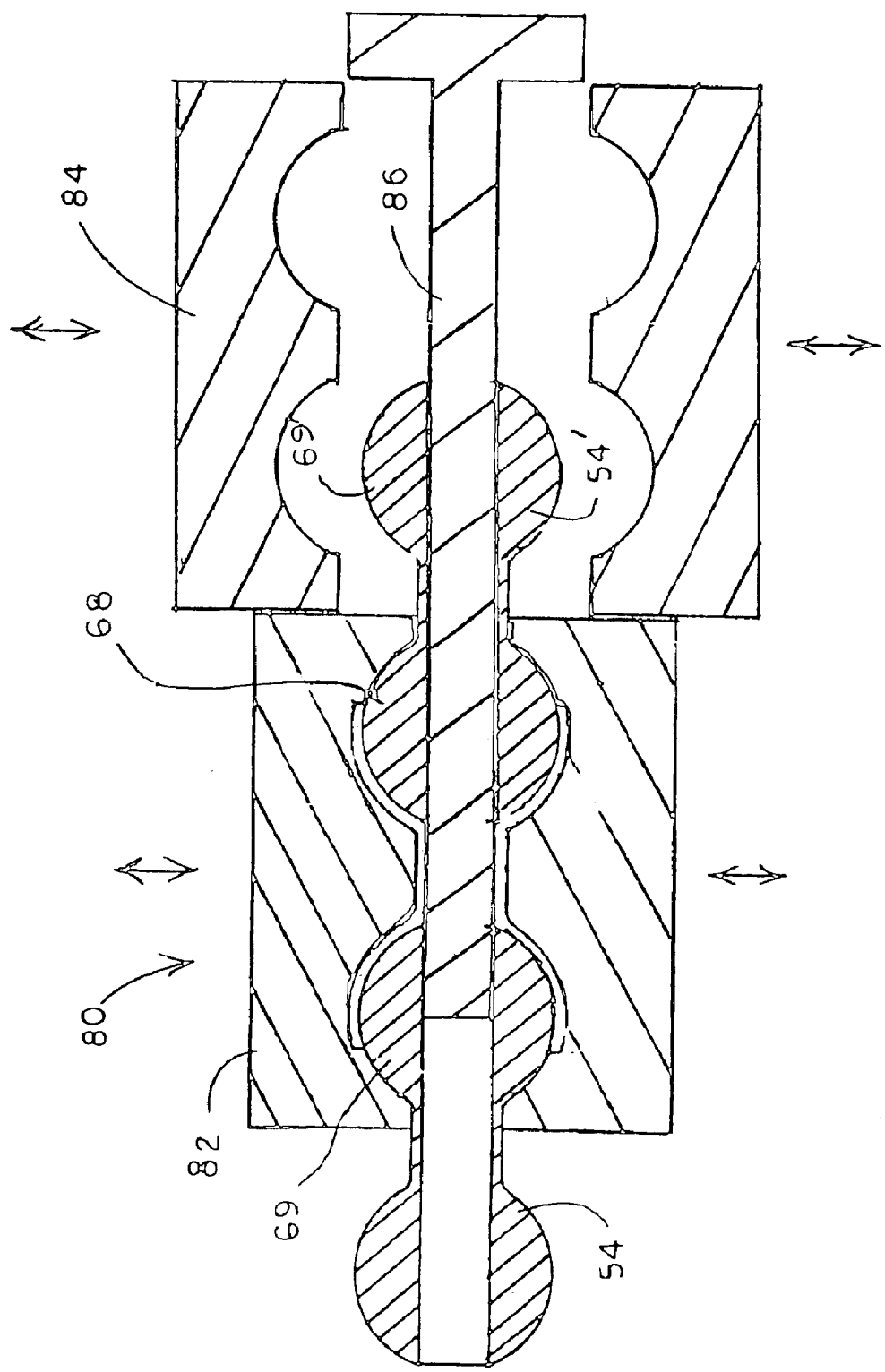
FIG. 7 is a side cross-sectional view of a mold apparatus particularly suited for producing components of the flexible conduit depicted in FIG. 6 in accordance with a further embodiment of the invention.

The male mold section 84 is then closed and a second male component 54' is formed. This second newly formed male component 54' is then indexed so that the ball member 68 is situated in the nearest right-most cavity in the female mold section 82. The female mold section is then closed about the two male components 54 and 54', as depicted in FIG. 7. As shown in this figure, the passageway core 86 can be long enough to through the male mold section 84 and at least partially into the female mold section 82 so that the core can help support and stabilize the two male components 54 and 54' within the female mold section.

With the male components situated within the female mold cavities, the female component 52 can be formed, with the female socket members 58, 59 being over-molded about the respective ball members 69, 68. Once the female component 52 is formed, the mold halves of the female mold section can be moved apart and the entire assembly of two male components 54 and 54' connected by the female component 52 can be indexed so that the ball member 69' is now situated within the left-most female cavity. A new male component can be formed in the male mold section 84, and the process continuous to produce a continuous flexible conduit formed of two sets of like-configured links.

One advantage of the embodiment show in FIGS. 6 and 7 is that different materials can be easily used for the female components 52 and male components 54. For instance, the different materials can have different melting temperatures, so that the two-shot process can have cooling requirements than in the prior embodiment. In addition, the materials can have different colors so that a continuous conduit of alternating colors can be formed.

It is noted that the starting and ending pieces of the conduit 50 may have special process requirements. For example, the starting piece can be inserted into the female mold section so that the first molded female component can be over-molded around the starting piece. In this instance, the first molded male component would be indexed to the position of the component 54' shown in FIG. 7, while the left-most male component 54 would be replaced by the specific starting piece. The same modification can be applied to provide a different ending piece. It may be preferable to employ a mold apparatus 80 that can substitute different mold sections in the starting and ending segments. This mold section substitution can also be used to insert a particular component having a different external configuration in the middle of the continuously formed flexible conduit.

As shown in FIG. 6, the conduit 50 may be covered by an outer sheath 75. This sheath may extend over the entire length of the finished the product, or only a particular section. In one embodiment, the sheath 75 is formed of a relatively flexible web of material so as not to interfere with the articulating movement of each joint 73. Alternatively, the sheath can be formed of a relatively rigid material to prevent articulation of certain sections of the continuous conduit. The sheath 75 can provided added protection against leakage from the conduit, as well as shield the conduit form the elements.

The methods of producing the continuous series of ball-and-socket joints described above are inherently less costly than the conventional method of assembly in which a ball is pressed into a corresponding socket. The methods also yield a tight seal without need for separate rubber rings or seals. The joint produced in this manner cannot be disassembled short of breaking the plastic it is molded from.

The proper selection of materials is important to insure durability and reliability for the flexible conduits of the present invention. The materials preferably have low surface abrasion properties and a low coefficient of friction between components formed of these materials. Various additives may be added to the base polymers to decrease friction between the two parts.

Shrinkage rates of both materials are critical as this sets the retained stress in the articulating joints after processing. The melt and glass transition temperatures are important for the materials, since it is essential that the second material molded does not erode the structure, geometry or surface finish of the first material. The over-molded material tends to shrink over the first formed component, using it as an armature. Thus, the underlying component prevents the over-molded material from totally reaching the shrinkage equilibrium point, producing retained stress in the resulting joint. Although this retained stress will decrease with time it will never decline to null. This retained stress caused by the relative shrinkage of the materials ensures a tight, substantially leakproof fluid joint. A joint configured in accordance with the present invention requires no additional elastomeric or other type of seals.

This assembly may be produced using the "in-mold-assembly" process, which minimizes post-mold assembly and maximizes quality. In this process, the complete assembly would be molded on a multi-material injection-molding machine. The conduit components may be molded in a variety of configurations, meeting the requirements of many applications.

The economic advantages of producing the inventive flexible conduit with "in-mold assembly" are obvious, where finished parts exit the molding machine on every cycle. Costly labor and automated assembly machines are not needed. Quality is improved because of the reduction in variation caused by the tolerance stack-ups inherent in conventionally manufactured components.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

I claim:

1. A flexible conduit comprising a plurality of like-configured components, each of said components including a male member, a female member overmoldingly secured to a male member of an immediately adjacent one of said plurality of components, and a passageway extending between said male member and said female member.

2. The flexible conduit according to claim 1, wherein said male member of one component and said female member of an immediately adjacent component define an articulating joint.

3. The flexible conduit according to claim 2, wherein said articulating joint is a ball-and-socket joint.

4. The flexible conduit according to claim 2, wherein said passageway in each of said plurality of components is configured so that the passageway in adjacent components remain in communication at any orientation of said articulating joint.

5. The flexible conduit according to claim 1, wherein said female member is overmoldingly secured to said male member to define a close running fit therebetween.

6. The flexible conduit according to claim 1, wherein said female member is overmoldingly secured to said male member to define a substantially fluid-tight fit therebetween.

7. The flexible conduit according to claim 1, wherein a first number of said plurality of components is formed of a first material and a second number of said plurality of components is formed of a second material different from said first material.

8. The flexible conduit according to claim 7, wherein said first material and said second material have different colors.

9. The flexible conduit of claim 1 wherein the passageway extends through the male member, and wherein the passageway is in the form of a cylinder having a uniform diameter through its length.

10. A flexible conduit comprising:
a first number of like-configured components, each of said first number of components including a first male member, a second male member, and a passageway extending between said first and second male members; and a second number of like-configured components, each of said second number of components including a first female member, a second female member, and a passageway extending between said first and second female members, at least one of said first and second female members overmoldingly secured to said first male member of an adjacent one of said first number of components.

11. The flexible conduit according to claim 10, wherein said first male member and said female member overmoldingly secured to said first male member define an articulating joint.

12. The flexible conduit according to claim 11, wherein said articulating joint is a ball-and-socket joint.

13. The flexible conduit according to claim 11, wherein said passageway in each of said first and second number of components is configured so that the passageway in adjacent components remain in communication at any orientation of said articulating joint.

14. The flexible conduit according to claim 10, wherein said female member is overmoldingly secured to said first male member to define a close running fit therebetween.

15. The flexible conduit according to claim 10, wherein said female member is overmoldingly secured to said first male member to define a substantially fluid-tight fit therebetween.

16. The flexible conduit according to claim 10, wherein said first number of components is formed of a first material and said second number plurality of components is formed of a second material different from said first material.

17. The flexible conduit according to claim 16, wherein said first material and said second material have different colors.

18. A flexible conduit comprising a plurality of like-configured components, each of said components including a male member having a maximum outer diameter, a female member pivotally secured to a male member of an immediately adjacent one of said plurality of components, wheerin said female member is overmoldingly secured to said male member to define a close running fit therebetween, the female member having an end opening having an aperture diameter, the male member disposed in part within the end opening, wherein the maximum diameter exceeds the aperture diameter by an amount such that moving the maximum diameter through the aperture causes plastic deformation of at least one of the female member and the male member, the flexible conduit further comprising a passageway extending between said male member and said female member.

19. The flexible conduit according to claim 18, wherein said male member of one component and said female member of an immediately adjacent component define an atriculating joint.

20. The flexible conduit according to claim 19, wherein said articulating joint is a ball-and-socket joint.

21. The flexible conduit according to claim 19, wherein said passageway in each of said plurality of components is configured so that the passageway in adjacent components remain in communication at any orientation of said articulating joint.

22. The flexible conduit according to claim 18, wherein a first number of said plurality of components is formed of a first material and a second number of said plurality of components is formed of a second material different from said first material.

23. A flexible conduit comprising:

a first number of like-configured components formed of a first material having a first melting characteristic, each of said first number of components including a first male member, a second male member, and a passageway extending between said first and second male members; and a second number of like-configured components formed of a second material having a second melting characteristic different from the first melting characteristic, each of said second number of components including a first female member, a second female member, and a passageway extending between said first and second female members, at least one of said first and second female members moveably secured to said first male member of an adjacent one of said first number of components, wherein said female member is overmoldingly secured to said first male member to define a close running fit therebetween.

24. The flexible conduit according to claim 23, wherein said first male member and said at least one of said first and second female members define an articulating joint.

25. The flexible conduit according to claim 24, wherein said articulating joint is a ball-and-socket joint.

26. The flexible conduit according to claim 24, wherein said passageway in each of said first and second number of components is configured so that the passageway in adjacent components remain in communication at any orientation of said articulating joint.

27. The flexible conduit according to claim 23, wherein said female member is overmoldingly secured to said first male member to define a substantially fluid-tight fit therebetween.

28. The flexible conduit according to claim 23, wherein said first material and said second material have different colors.

* * * * *